(12) United States Patent
Steinberg

(10) Patent No.: US 6,798,933 B2
(45) Date of Patent: Sep. 28, 2004

(54) FIBER OPTIC ARRAY SWITCH

(75) Inventor: Dan A. Steinberg, Blacksburg, VA (US)

(73) Assignee: Shipley Company, L.L.C., Marlborough, MA (US)

(*) Notice: Subject to any disclaimer, the term of this patent is extended or adjusted under 35 U.S.C. 154(b) by 74 days.

(21) Appl. No.: 09/833,282

(22) Filed: Apr. 12, 2001

(65) Prior Publication Data

US 2001/0048785 A1 Dec. 6, 2001

Related U.S. Application Data

(60) Provisional application No. 60/197,120, filed on Apr. 14, 2000.

(51) Int. Cl.$^7$ ................................................. G02B 6/35
(52) U.S. Cl. ............................. 385/16; 385/15; 385/19
(58) Field of Search ............................ 385/16–19, 15

(56) References Cited

U.S. PATENT DOCUMENTS

| | | | |
|---|---|---|---|
| 3,864,018 A | 2/1975 | Miller ...................... 350/96 C |
| 4,225,213 A | 9/1980 | McBride, Jr. et al. ..... 350/96.2 |
| 4,407,562 A | 10/1983 | Young ........................ 350/96.2 |
| 4,415,229 A | * 11/1983 | McCullough ............... 335/136 |
| 4,725,114 A | 2/1988 | Murphy ....................... 385/59 |
| 4,932,745 A | * 6/1990 | Blonder ....................... 385/18 |
| 4,973,127 A | 11/1990 | Cannon, Jr. et al. .......... 385/35 |
| 5,044,711 A | 9/1991 | Saito ........................... 385/33 |
| 5,123,073 A | * 6/1992 | Pimpinella ................... 385/59 |
| 5,135,590 A | 8/1992 | Basavanhally et al. ....... 156/64 |
| 5,181,216 A | * 1/1993 | Ackerman et al. ........... 372/36 |
| 5,185,846 A | 2/1993 | Basavanhally et al. ..... 385/137 |
| 5,257,332 A | * 10/1993 | Pimpinella ................... 385/59 |
| 5,337,384 A | 8/1994 | Basavanhally et al. ....... 385/54 |
| 5,357,590 A | 10/1994 | Auracher ..................... 385/33 |
| 5,379,361 A | 1/1995 | Maekawa et al. ............ 385/65 |
| 5,440,655 A | * 8/1995 | Kaplow et al. .............. 385/25 |
| 5,500,910 A | * 3/1996 | Boudreau et al. ........... 385/24 |
| 5,500,911 A | 3/1996 | Roff ............................ 385/33 |
| 5,611,006 A | * 3/1997 | Tabuchi ...................... 385/14 |
| 6,056,696 A | 5/2000 | Kallman .................... 600/459 |
| 6,064,781 A | * 5/2000 | Seibold et al. ............... 385/14 |
| 6,101,299 A | 8/2000 | Laor ........................... 385/16 |
| 6,320,997 B1 | 11/2001 | Dautartas et al. ............ 385/19 |
| 6,477,303 B1 | 11/2002 | Witherspoon ............... 385/52 |
| 6,519,382 B1 | 2/2003 | Jurbergs et al. .............. 385/18 |

FOREIGN PATENT DOCUMENTS

| JP | 63085522 | 4/1988 |
|---|---|---|
| JP | 1999305151 A | 11/1999 |

\* cited by examiner

Primary Examiner—Michael C. Zarroli
(74) Attorney, Agent, or Firm—Niels Haun; Jonathan D. Baskin

(57) ABSTRACT

An optical switch is provided for selectively coupling outputs of one or more fibers of a first array to one or more inputs of fibers of a second array. The first array includes a first groove disposed within a front face of the first array. The second array optionally includes a second groove disposed within a front face of the second array. The first and second fiber arrays are oriented so that their respective front faces are disposed in a facing relationship. A roller element is located within at least the first groove, permitting the first array to translate relative to the second array upon the roller element along the direction of the first groove. In addition, detents may be formed within the grooves of each array to create areas in which the roller element may at least temporarily seat. The location and number of detents are arranged to correspond to the location and number of rows of fibers in the respective arrays. Retention of the roller element within a detent permits more accurate registration between fibers of the first and second arrays.

75 Claims, 11 Drawing Sheets

FIBER OPTIC ARRAY SWITCH

Applicants claim the benefit of priority of U.S. Provisional Application 60/197,120, filed on Apr. 14, 2000, the entire contents of which are incorporated herein by reference.

FIELD OF THE INVENTION

The present invention relates generally to a fiber optic switch for selectively coupling at least one fiber of a first array to at least one fiber of a second array, and more particularly to a switch in which the arrays translate relative to one another on friction reducing elements such as roller elements disposed within respective grooves of at least one of the arrays to switch the alignment of the at least one fiber of the first array relative to the at least one fiber of the second array.

BACKGROUND OF THE INVENTION

The need for switching to provide selective routing of information is becoming increasingly more important in optical data networks. In order to effect optical switching, different types of switches may be used which meet different performance criteria. For example, such switches may commonly be characterized by switching speed, coupling loss, and connectivity. In addition, cost, reliability, and durability over switching lifetime are also important design considerations for such switches.

In certain applications, such as optical computer networks, high switching speed may not always be the most significant design criteria. In lieu of optimizing switching speed, such optical computer networks may employ inexpensive optical switches that are mechanically robust. As a result, the optical switches used in these types of optical computer networks may be mechanical in nature. Also, such switches should provide relatively high connectivity capability and minimal coupling loss between fibers. Such design goals, however, necessitate improved fiber to fiber alignment within the switch. Hence, it would be desirable to provide a mechanically robust switch, which is simple to assemble, and which provides improved fiber to fiber alignment resulting in decreased coupling loss.

SUMMARY OF THE INVENTION

In accordance with the present invention, a fiber optic switch is provided for selectively coupling one or more fibers of a first array to one or more fibers of a second array. To this end, a simplified mechanical switching arrangement is provided for effecting improved registration between the selected optical fibers. The switch includes a first fiber array and a second fiber array each having a front face. The arrays are oriented so that the first array opposes the second array. The front faces of the arrays are disposed in facing relation. A friction-reduction element, such as a roller element, is positioned intermediate the opposing faces of the first and second array to enable the arrays to be displaced relative to each other along the friction reduction element. Displacement of the one array relative to the other array causes a fiber in one array to be moved in or out of registration with a fiber in the other array to effect switching.

In a specific configuration of the switch, a first groove is disposed within the front face of the first array. Optionally, a second groove is disposed within the front face of the second array. A roller element is located within at least the first groove but in friction reducing contact with the opposing second array thereby permitting the first array to translate relative to the second array along the direction of the longitudinal axis of the first groove. The second groove may be positioned on the second array to oppose the first groove of the first array. As such, the roller element can be contained between the opposing grooves while providing friction reducing contact to the first and second arrays.

In a particular configuration, the arrays may be optionally oriented so that the grooves intersect one another at a selected angle, such as an orthogonal angle, to enable translation of the arrays relative to one another in two directions. Further, detents may optionally be formed within the grooves to create regions in which the rolling element at least temporarily seats to properly position one array relative to the other array. The location and number of detents are arranged to correlate to the position and number of rows of channels in the array, so that retention of the rolling element within the detents provides registration between fibers of the first and second arrays. Additional grooves and rolling elements may optionally be provided to enhance the stability between the first and second arrays, or to provide an additional direction of translation between the arrays.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 11:
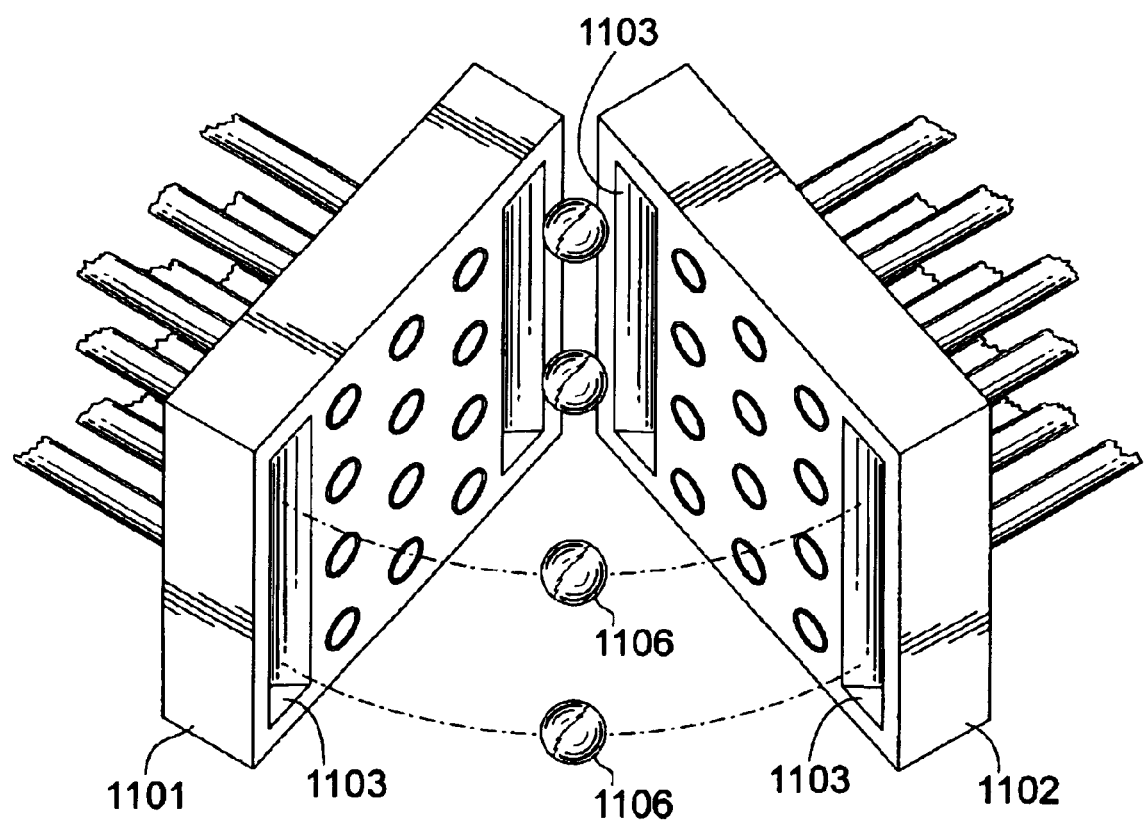
FIG. 11 schematically illustrates an exploded view of a switch of the present invention.

In accordance with the present invention, a fiber optic switch 100 is provided for selectively coupling outputs of one or more fibers 112 of a first array 101 to one or more inputs of fibers 112 of a second array 102. The selective coupling of fibers 112 is performed by displacing the arrays 101 and 102 relative to one another so that a selected fiber 112a of the first array 101 can be moved into alignment with a selected corresponding fiber 112b of the second array 102. Relative displacement of the fiber arrays 101 and 102 may be effected by translating one array relative to the other array. Translation may be effected by rolling action through the use of a roller element 106 serving as a friction-reduction element disposed between the two arrays. The roller element 106, such as a ball bearing in the form of a ball lens or rollable cylinder in the form of a fiber segment may be confined within complementary grooves 103, 104 of the respective array 101, 102. As shown in the exploded view of FIG. 11, a switch of the present invention having first and second arrays 1101, 1102 and grooves 1103, with rolling elements 1106 sandwiched therebetween. As such, one array may be translationally rolled relative to the other array in a desired direction about the roller to effect the desired switching function. The complementary grooves in each array may be disposed, such as in parallel alignment, to define a single path of movement Alternatively, the grooves in the two arrays may be disposed with intersecting paths, such as an orthogonal criss-cross, so that one array can be moved in one direction while the other array can be moved in another direction.

Figure 1:
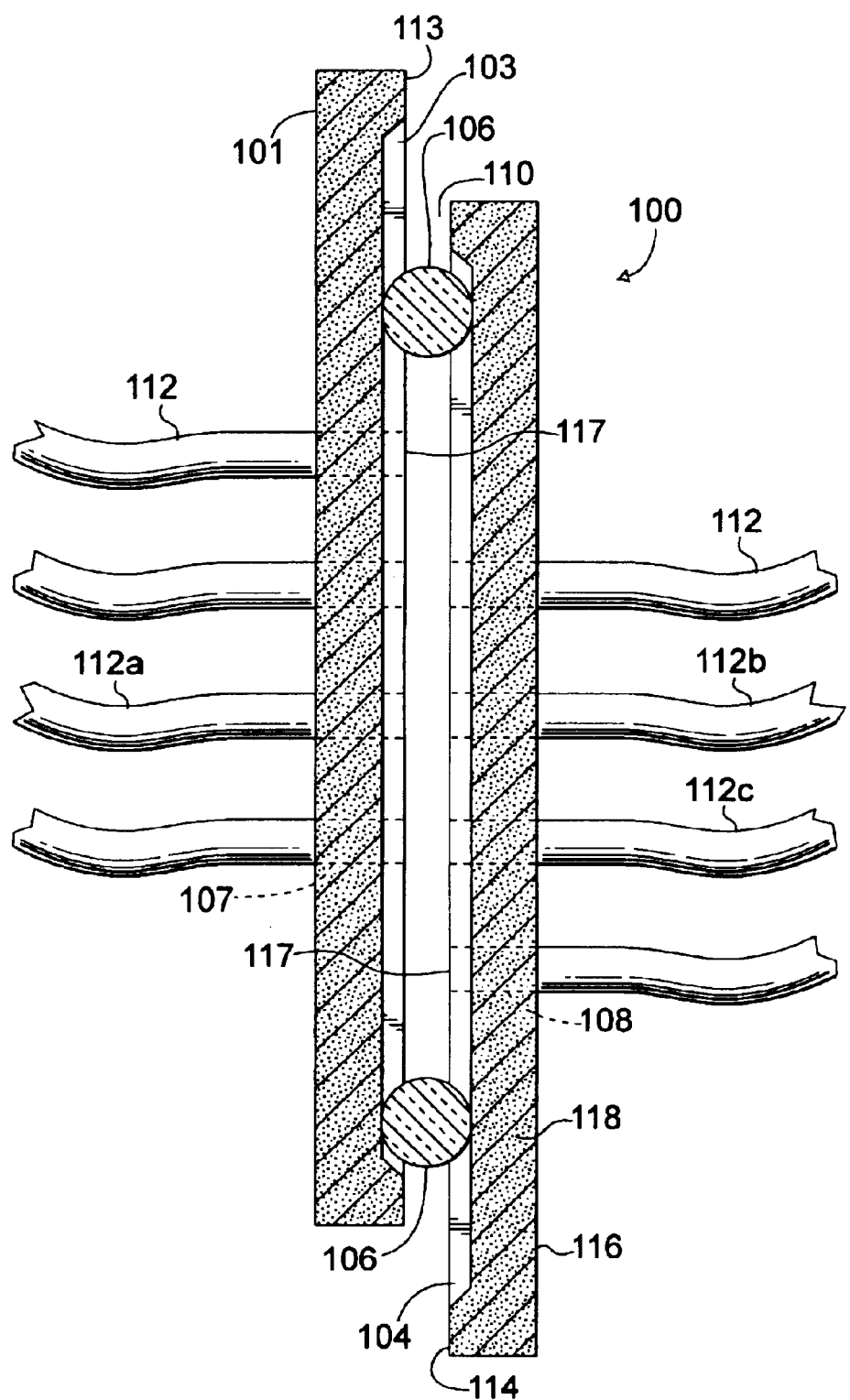
FIG. 1 schematically illustrates a cross-sectional side elevational view of a switch of the present invention.

Referring to FIG. 1, the arrays 101, 102 include respective front faces 113, 114 and respective opposing rear faces 115, 116. Channels 107, 108 for retaining one or more fibers 112 extend through the body 118, or frame, of the arrays 101, 102, from the respective rear faces 115, 116 to the respective front faces 113, 114 of each array 101, 102. The grooves and the channels can be provided in the silicon substrate body 118 by a single mask technique, so that the location of the roller elements 106 and the fibers 112 may be accurately determined.

The fibers 112 are disposed in the channels 107, 108 of the arrays 101, 102 and have endfaces 117 located at the exposed outer surfaces of the front faces 113, 114. The endfaces 117 of the fibers 112 may be perpendicular to the optical axis of the fibers 112 or disposed at an angle with respect to the optical axis. In addition, the endfaces 117 of the fibers 112 of the array 101 may be flat and coplanar with the front faces 113, 114 of the respective arrays 101, 102. Typically, the channels 107, 108 are configured so that the optical axes of the fibers 112 retained therein are generally perpendicular to the associated front faces 113, 114 of the arrays 101, 102.

Figure 2:
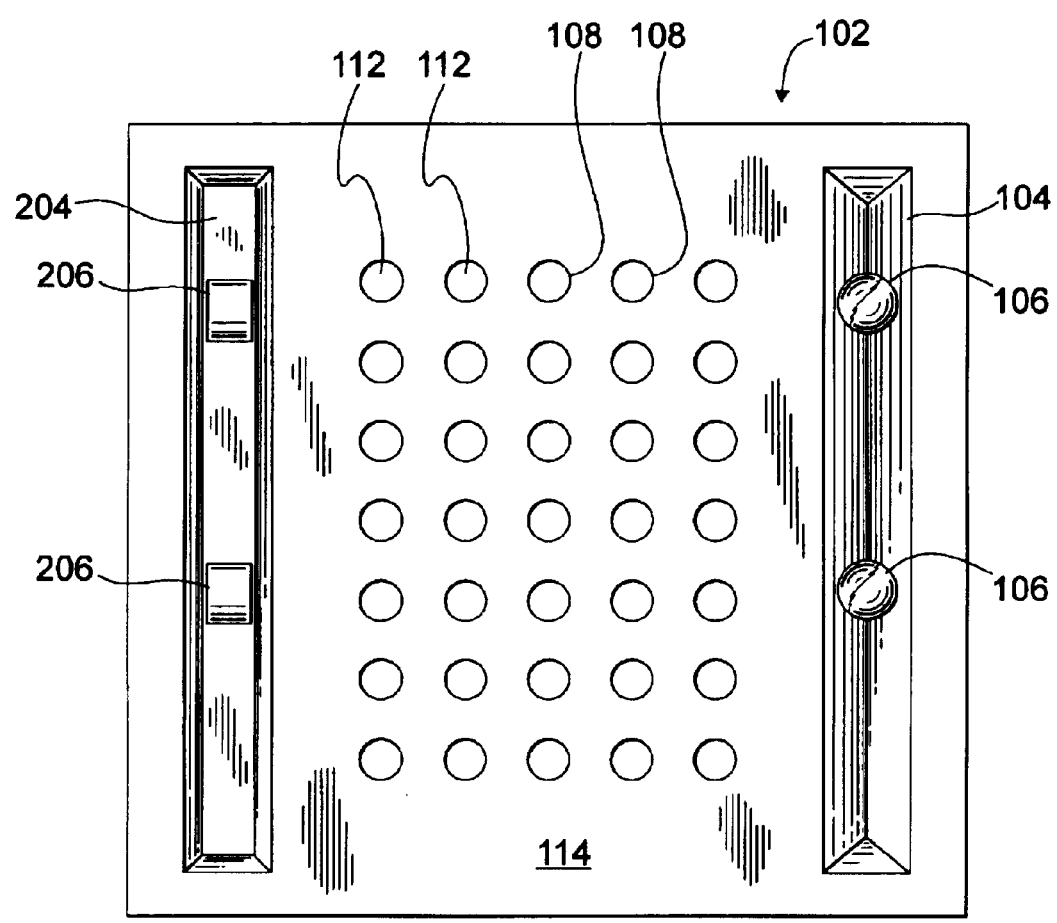
FIG. 2 schematically illustrates a front elevational view of an array of a switch of the present invention similar to the switch of FIG. 1 but with additional fibers and different types of rollers.

As an exemplary application, the first array 101 may retain a single fiber 112a, in which case the second array 102 may include at least two fibers 112b and 112c between which the single fiber 112a may be selectively switched. Typically, the arrays 101, 102 each contain a plurality of fibers 112 which can be arranged in a selected pattern, for example in a linear array, hexagonal grid, or rectangular grid, as shown in FIG. 2, or in some other suitable pattern. For selected applications, the pattern of the first array may be different from the pattern of the second array. For example, the first array 101 may contain fibers 112 disposed in a linear array, while the second array 102 may comprise fibers 112 disposed in a grid pattern.

As shown in FIG. 1, the arrays 101, 102 are oriented with their respective front faces 113, 114 in facing relation. The front faces 113, 114 are typically spaced apart from one another to leave a small gap 110 between the first array 101 and the second array 102. The gap may typically be about 1 to 15 microns. To minimize coupling losses between fibers 112 of the first array 101 and fibers 112 the second array 102, the gap 110 may be filled with a fluid having a refractive index closer to the refractive index of the fibers 112 than that of air. Ideally, the fluid in the gap 110 substantially matches the refractive index of the fibers 112. Alternatively, a lens may be disposed at the fiber endface to improve coupling between a fiber 112 of the first array 101 and a fiber 112 of the second array 102. The spacing, or pitch, among fibers 112 of an array 101, as defined by the spacing among the channels 107 of the array 101, may be selected relative to the size of the gap 110 and the characteristics of the optional lenses to minimize cross-talk between fibers 112 not in registration.

In order to reduce frictional wear caused by translation of the arrays 101, 102 relative to one another, friction reducing slide elements, in the form of roller elements 106, are sandwiched between the opposing front faces 113 and 114 of the opposing arrays 101, 102. As shown in FIG. 1, a pair of roller elements 106 are confined within opposing longitudinal grooves 103, 104 disposed in the front faces 113, 114 of the frame 118 of each array 101, 102. For purposes of providing smoother translation of one array relative to the other array, separate sets of grooves may be respectively provided on opposite sides of each respective front face 113, 114. The grooves 103, 104 may have a shape that permits the roller element 106 to roll along the path of the grooves 103, 104 as one array is translated relative to the other array. The path of the groove along the front face of any array defines the path of movement, both in terms of direction and distance, so that such array may be displaced relative to the other array. The groove path in any array thereby defines the switch path for such array. The groove path in any array must extend both in the direction and for the distance needed to effect the desired switching movement. For example, a fiber in a selected channel in one array must be capable of being moved in the desired direction and for the desired distance needed to position such fiber into respective registry for optical coupling with one or more fibers contained in selected channels in the opposing array.

FIG. 2 illustrates a view of the front face of an optical fiber array according to the present invention. As shown in FIG. 2, the array 102 includes two parallel grooves 104, 204 formed in the front face 114 of the array 102 along opposing edges of the front face 114. The grooves 104, 204 may have similar cross-sectional shapes or, as shown in FIG. 2, may have different cross-sectional shapes. For example, the groove 104 has a generally V-shaped cross-section to permit a spherical rolling element 106, such as a ball lens, to roll along the length of the groove 104. Alternatively, as shown in FIG. 2, the groove 204 includes a truncated V-shaped cross-section having a generally flat bottom in which a cylindrical roller element 206, such as a fiber segment, may slide or roll. A cylindrical shaped roller is useful in applications in which the arrays will be translated only in a single linear direction transverse to the axis of the roller. The depth of the groove 104 and the diameter of the roller element 106 are selected relative to one another so that a portion of the roller element 106 protrudes outward from the front face 114 of array 102 a sufficient distance to engage and hold the front face of the opposing array 101 either lightly in contact or preferably at least slightly out of contact with front face 114 of array 102.

The arrays 101, 102 are oriented with respect to one another so that at least a portion of their respective grooves 103, 104 are in registration. The alignment of the grooves 103, 104 of the two arrays 101, 102 permits one or more roller elements 106 to be disposed simultaneously in the grooves 103, 104 of each array 101, 102. A bias force may be applied to the arrays 101, 102, by a mechanism such as a spring, to hold the arrays 101, 102 in facing relation to ensure that the rolling elements 106 are confined within the opposing grooves 103, 104 of the respective arrays 101, 102.

In a first configuration of the switch 100, the opposing grooves 103, 104 of the first and second arrays 101, 102 may be coextensive in both length and width. In such a configuration, the two arrays 101, 102 translate past one another in a single direction corresponding to the direction and the length of the grooves 103, 104. As the first array 101 translates relative to the second array 102, switching is effected by the alignment of fibers 112 of the first array 101 to corresponding fibers 112 of the second array 102. The lengths of the grooves 103, 104 are selected to permit a desired range of motion between the arrays 101, 102. For example, if each array comprises a grid of fibers 112, the respective grooves in each array should extend at least a distance corresponding to the pitch of adjacent fibers to enable switching between adjacent fibers along the path of the groove. To enable switching along an entire row or column of the grid, the grooves should span the full length of the grid, as shown in FIG. 2. Alternatively, if an array comprises a linear array of fibers arranged along a line orthogonal to the direction of translation, the groove may have a minimal length matched to the diameter of the roller element. In such a configuration, the array can be paired with a second array having a longer groove in the direction of the linear array and for the desired length of the linear array of fibers.

Additional grooves and roller elements may be included in the switch 100 to provide added stability between the first array 101 and the second array 102. For example, providing roller elements on both sides of the opposing arrays serves to eliminate potential tilting of one array relative to the other. The elimination of relative tilt between the arrays reduces the potential for misalignment between the fibers of the first array and the fibers of the second array. Since misalignment among fibers induces a coupling loss, it is desirable to remove degrees of freedom from the switch which are not associated with the switching function.

The paths of the grooves on the respective arrays function to define paths of movement for the switching function. In a configuration where translation between the arrays in only one direction is desired to effect switching, the array configuration may include two parallel, grooves 104, 204 each containing two roller elements 106, 206, respectively, as shown in FIG. 2. In such a switch, the four roller elements 106, 206 are positioned along the face 114 of the array 102 to provide a stable support plane for the opposing array.

The improved stability provided by the additional roller elements 106, 206 is based in part on their initial placement away from each other. However, once the first array 101 has translated to the end of its range of motion with respect to the second array 102, the pairs of roller elements 106 and 206 may have the tendency of remaining in contact with one another. Subsequent translation of the arrays 101, 102 may not induce any separation between the contacting pairs of roller elements 106, 206. Consequently, once the arrays 101, 102 have completed travel through the full range of motion, the added stability provided by multiple roller elements may be diminished unless the roller elements are held in separate positions within the grooves by detents, for example.

Figure 3:
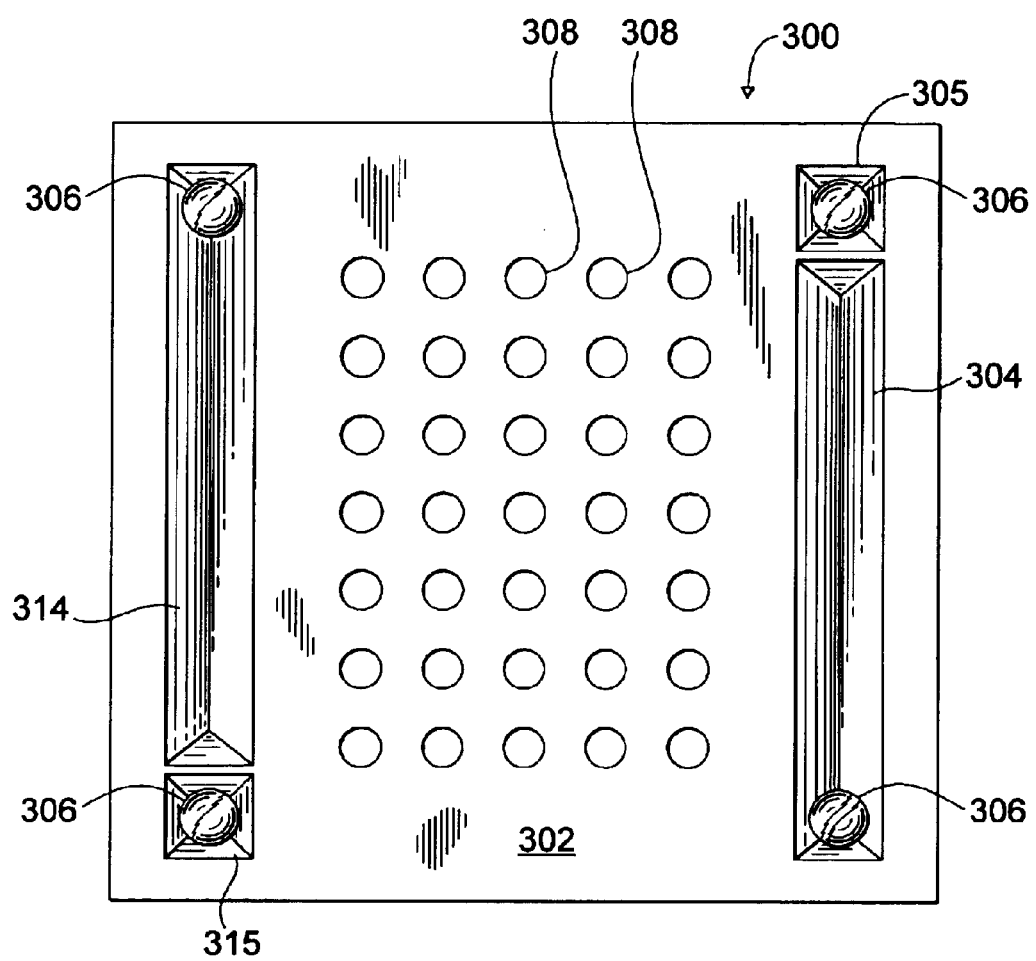
FIG. 3 schematically illustrates an array having shortened grooves for retaining a roller element in place within the shortened grooves.

Alternatively, a different groove configuration, such as that depicted in FIG. 3, may be used to maintain spacing among roller elements 306. Instead of the single groove 104 depicted in FIG. 2, the array 302 of FIG. 3 includes a pair of grooves 304, 305 and 314, 315 in the front face of the array 302. More specifically, a shortened groove 305 in the form of a cavity and a longer longitudinal groove 304 are formed along one side of the front face of the array 302. Likewise, a shorter groove 315 and a longer groove 314 are formed on the other side of the front face of the array 300. As shown in FIG. 3, the grooves 304 and 305 may be collinear. Alternatively, the shorter groove 305 may be offset or even disposed to one side of the longer groove 304. A roller element 306 is disposed within each of the shorter grooves 305, 315, respectively, and each of the longer grooves 304, 314. The shortened grooves 305, 315 have a length and width substantially matched to a selected dimension of the roller element 306, such as the diameter of the roller element. The length and width of the shorter groove is selected so that the roller elements 306 may freely roll within the shortened grooves 305, 315 without translating any significant distance within the shortened grooves 305, 315. Translational movement of the roller element is confined to maintain a stable support plane provided by such roller elements for the opposing array.

As shown in FIG. 3, the first shortened groove 305 is disposed adjacent the first longitudinal groove 304 and along the longitudinal axis of the first longitudinal groove 304. Similarly, the second shortened groove 315 is disposed adjacent the second longitudinal groove 314 and along the longitudinal axis of the second longitudinal groove 314. The longitudinal axes of the first and second longitudinal grooves 304, 314 are oriented parallel to one another.

The first set of grooves 304, 305 and the second set of grooves 314, 315 are respectively disposed on opposite sides of the fiber channels 308. In addition, the first shortened groove 305 and the second shortened groove 315 are disposed in diametrically opposite positions, i.e. at opposite corners, across the array of channels 308, as shown in FIG. 3. Roller elements 306 are confined for rotational movement in each of the first and second shortened grooves 305, 315 and are confined for rotational and translational movement in each of the first and second longer grooves 304, 314.

Suitable structure may be provided to confine translational movement of the roller elements 106 within the longer grooves 304, 314 whenever the array 302 is translated relative to its opposing array to effect switching. For example, a suitable groove pattern may be provided on the opposing array which functions to confine any undesired translations movement of the roller elements 106 within the longer grooves 304, 314 of the array 302.

Figure 4:
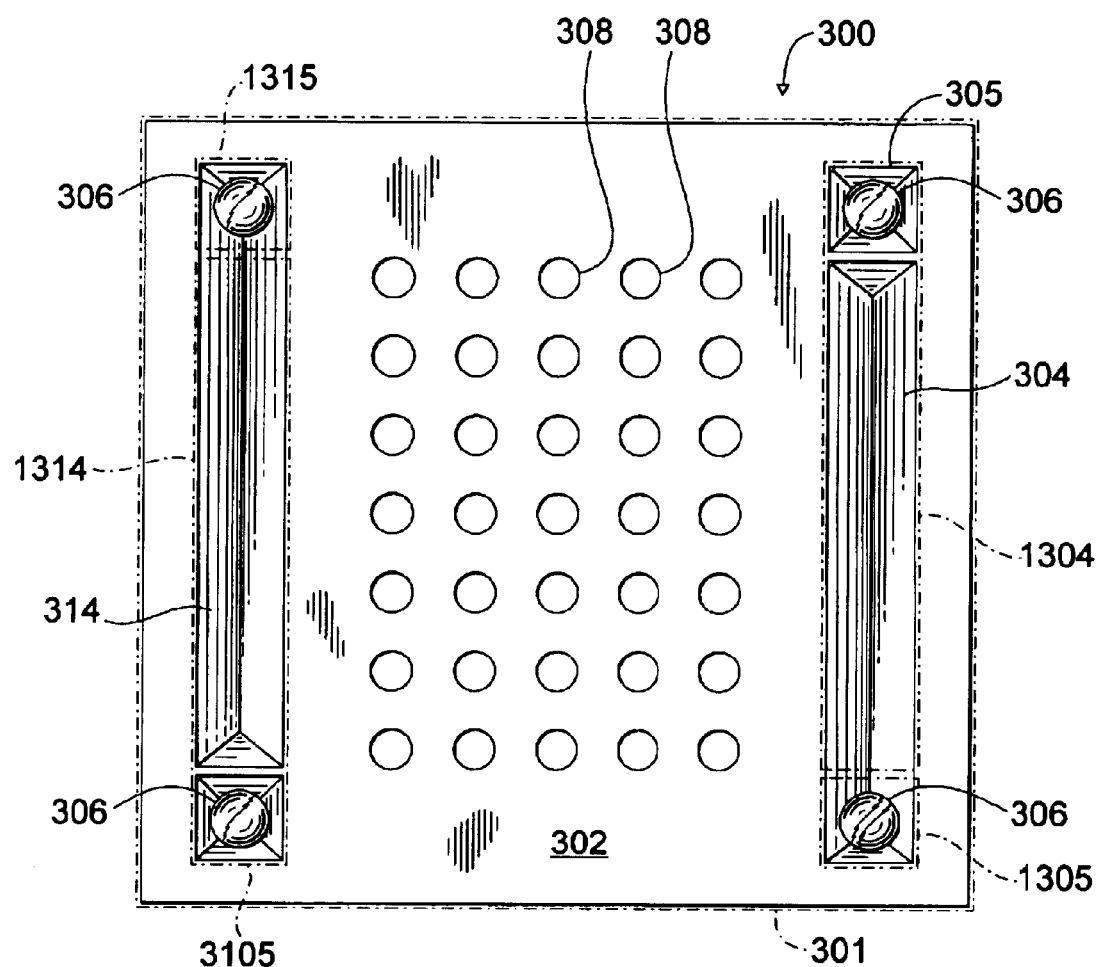
FIG. 4 schematically illustrates the array of FIG. 3 with an overlying complementary array, shown in phantom for purposes of clarity.

Referring now to FIG. 4, for example, a fiber array switch 300 is diagrammatically depicted having the front face of an opposing array 301, shown in phantom, positioned to oppose the array 302, shown in solid, in face to face relationship. The array 302, shown in solid, is identical to the array shown and described in connection with FIG. 3. The front face of the array 301, shown in phantom, is similar to the array 302 shown in solid. The front face of array 301 is shown in phantom to best depict the cooperation of the groove arrangement of array 301 relative to the groove arrangement of array 302. The cooperating grooves of the opposing arrays 301 and 302 function to retain the roller elements 306 in position generally at the outer periphery of the opposing arrays 301 and 302. As shown in FIG. 4, the roller elements 306 are confined at the corners of the opposing arrays 301 and 302.

More specifically, the phantom array 301 is oriented so that the front face of such array 301 is in facing relation with the front face of the other array 302 to form a fiber array switch 300. The array 301, shown in phantom, includes a longer groove 1304 and a shorter groove 1305 positioned on one side of the array and a longer groove 1314 and a shorter groove 1315 positioned on the other side of the array. The opposing arrays 301 and 302 are positioned in face to face relationship so that the one set of grooves 1304, 1305 of array 301 are aligned with complementary grooves 304, 305 of the other array 302 and so that the other set of grooves 1314, 1315 of array 301 are aligned with the complementary grooves 314, 315 of such other array 302. The respective grooves are positioned so that the shorter grooves 305 and 315 of the one array 302 are positioned in different corners than the shorter grooves 1305 and 1315 of the phantom array 301. As such, on one side of the switch, the shorter groove 305 of array 302 faces and registers with an end portion of the longer groove 1304 of the phantom array 301 while an end portion of the longer groove 304 of array 302 faces and registers with the shorter groove 1305 of such phantom array 301. On the other side of the switch, the longer and shorter grooves 314, 1315 of array 302 are aligned in a similar fashion with the shorter and longer grooves 1314, 1315, respectively, of the phantom array 301.

Thus, each of the four roller elements 306 is disposed within a shortened groove of one array and within a longer groove of the other array. Accordingly, the two roller elements 306 retained within the shorter grooves 305, 315 of the one array 302 are located in fixed position with respect to such array 302. Likewise, the two roller elements 306 retained in the shorter grooves 1305, 1315 of the opposing phantom array 301 are located in fixed position with respect to the phantom array 301. The roller elements retained in the shorter grooves 305, 315 are free to translate within the complementary longitudinal grooves 1304, 1314 of the phantom array 301. Likewise, the roller elements retained in the shorter grooves 1305, 1315 of the phantom array 301 are free to translate within the longer grooves 304 of the first array 302.

The switching function of the switch 300 is effected by translating the first array 302 with respect to the second array 301 along the direction of the longitudinal grooves 304, 1304. As the arrays are translated, each of the roller elements 306 will be retained in fixed relation with respect to either the first array 302 or the second array 301. Additionally, the respective roller elements 306 will be held out of contact with each other as the arrays 302, 301 translate relative to one another.

Alternative groove arrangements may also be provided to permit translation of opposing arrays in two dimensions. Such an arrangement may include grooves disposed along two, non-parallel directions. For example, one array may contain two grooves disposed perpendicular to one another to effect translation in each of the two perpendicular directions. One particular configuration of such an array is illustrated in FIG. 5.

The two dimensional array 502 includes a front face 503 having at least a first groove 504 extending along a first path of movement. Additionally, a second groove 507 is positioned along the face at an intersecting path angle relative to the first groove 504 to provide a second path of movement. For the specific arrangement shown in FIG. 5, the array 502 includes pairs of orthogonal grooves 504, 507 formed therein in which one or more roller elements 506 are disposed. A pair of longitudinal grooves 504 extend along the edges of the array 502 to define a first direction of translation. A pair of cross grooves 507 are oriented perpendicular to the longitudinal axes of the longitudinal grooves 504. The cross grooves 507 define a second direction of translation which is orthogonal to the first direction of translation. Optionally, only a single cross groove 507 may be used to extend away from a single longitudinal groove 504 in any non-parallel direction to create a second direction of translation.

Figure 5:
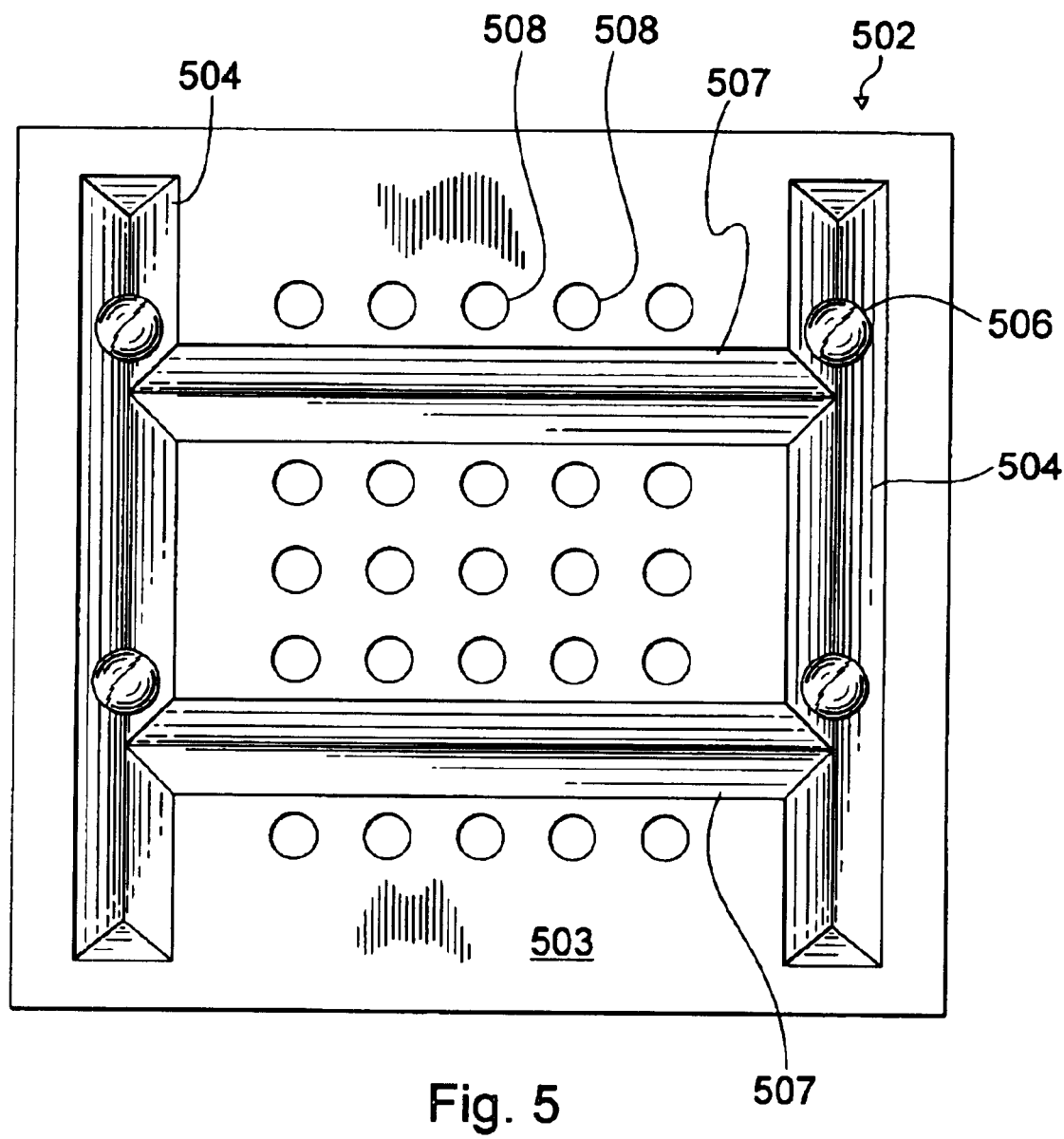
FIG. 5 schematically illustrates an array having a groove configuration permitting array translation in two dimensions.

As shown in FIG. 5, the cross grooves 507 have first ends in communication with one longitudinal groove 504 so that the roller elements 506 disposed within such longitudinal groove 504 may translate relative to the cross grooves 507. The second longitudinal groove 504 is disposed parallel to the first longitudinal groove 504 at the opposite edge of the array 502. The second longitudinal groove 504 communicates with second ends of the cross grooves 507 to form a latticed groove path.

A plurality of channels 508 for holding optical fibers in a selected array are disposed between the pair of longitudinal grooves 504 located at the edges of the array. A number of the channels 508 may be disposed between the cross grooves 507 as shown in FIG. 5. Alternatively, all or none of the channels 508 may be disposed between the cross grooves 507. Similarly, a selected number of the channels 508 may be disposed between the first and second longitudinal grooves 504.

A fiber optic array switch may be formed using two identical arrays 502 disposed in facing relation so that the respective longitudinal and transverse grooves 504, 507 are in registration. The two arrays 508 are spaced sufficiently close so that the roller elements 506 are contained within the complementary grooves 504, 507 of each array 502.

Figure 6:
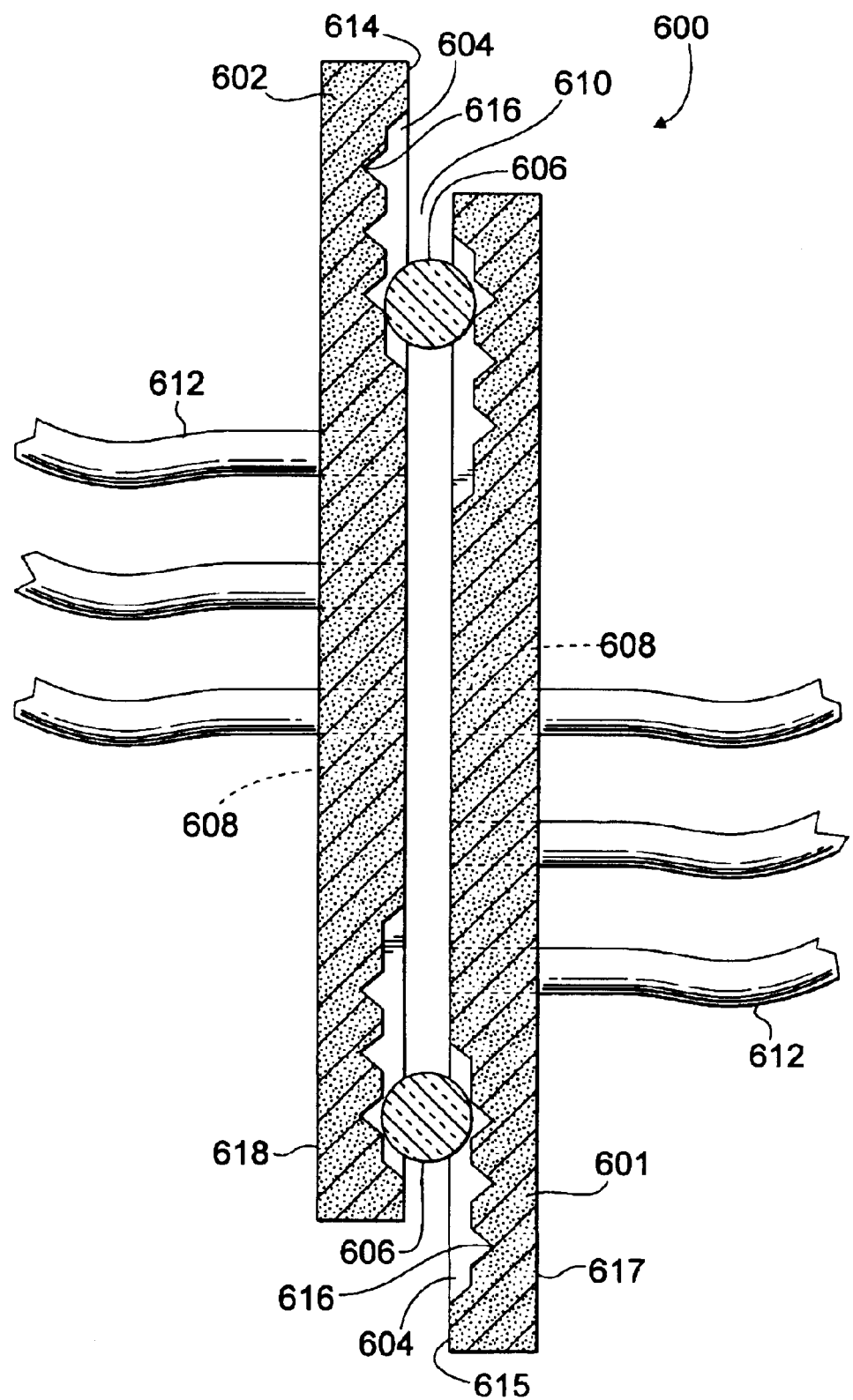
FIG. 6 schematically illustrates a cross-sectional side elevational view of a switch of the present invention having detents within the grooves.

Still further, detents may be located within the grooves of opposing arrays to enable one array to be more precisely positioned relative to the other array. The use of cooperating detents in the opposing grooves of the arrays thereby facilitates more accurate registration between fibers of the first array and fibers of the second array. Referring to FIG. 6, a fiber array switch 600 is shown comprising two arrays 601, 602 having grooves 604 which include detents 616. The switch 600, as depicted in FIG. 6, is similar to the switch 100 of FIG. 1, except that the array switch 600 shown in FIG. 6 includes two shorter grooves 604 in place of the single, longer groove 104 of switch 100 and detents 616 are provided in the grooves 604.

As shown in FIG. 6, a pair of grooves 604 are formed in a front face 614 of the array 602 and extend along a common longitudinal axis. Likewise, a pair of complementary grooves 604 are formed in the front face 615 of the array 601. A roller element 606 is contained within each set of opposing complementary grooves 604. A plurality of channels 608 for retaining fibers 612 extend from the front faces 614 and 615 of each array 602 and 601, respectively, through the body of the arrays 602 and 601 to a respective rear face 618 and 617 of each respective array 602 and 601. Typically, each channel 608 has a longitudinal axis which is oriented perpendicular to the front faces 614 and 615 of the respective arrays 602 and 601. Detents 616 are formed in the grooves 604 to provide recessed areas within the grooves 604 in which the roller elements 606 may temporarily seat. The detents 616 extend relative the front face 614 of the array 602 a distance greater than that of the grooves 604, so that the roller elements 606 may seat within the detents 616. The detents 616 may have a generally triangularly shaped cross-section or may have alternative shapes suitable for retaining the roller elements 606 in place. For example, the detents 616 may have a generally rectangularly shaped cross-section.

In order to provide proper registration between fibers 612 of the first array 601 the fibers 612 of the second array 602, the detents 616 are spaced relative to one another according to the pitch of the fibers 612 of the respective arrays 601 and 602. For example, the array 601 includes a preselected number of fibers 612 arranged in a column according to a preselected pitch along the direction of the longitudinal axis of the grooves 604. In turn, a number of detents 616 correlated to the preselected number of fibers in a column is included within each groove 604. For example, as depicted in FIG. 6, three detents 616 are provided in each groove 604 for receiving the roller elements 606 in each respective groove. As such, the three detents in each groove directly correspond to the three fibers in the array column. In general, the spacing among the detents 616 preferably corresponds to the spacing among the fibers 612 of the associated array 602 and corresponds to the detents in the opposing groove of the opposing array 601. Translational movement of the arrays 601 and 602 along the direction of the grooves 604 causes the roller elements to temporarily come to rest within opposing detents of the opposing arrays 601 and 602. Alignment of the opposing detents causes at least one fiber in one array 601 to align with a corresponding fiber of the other array 602.

Figure 7:
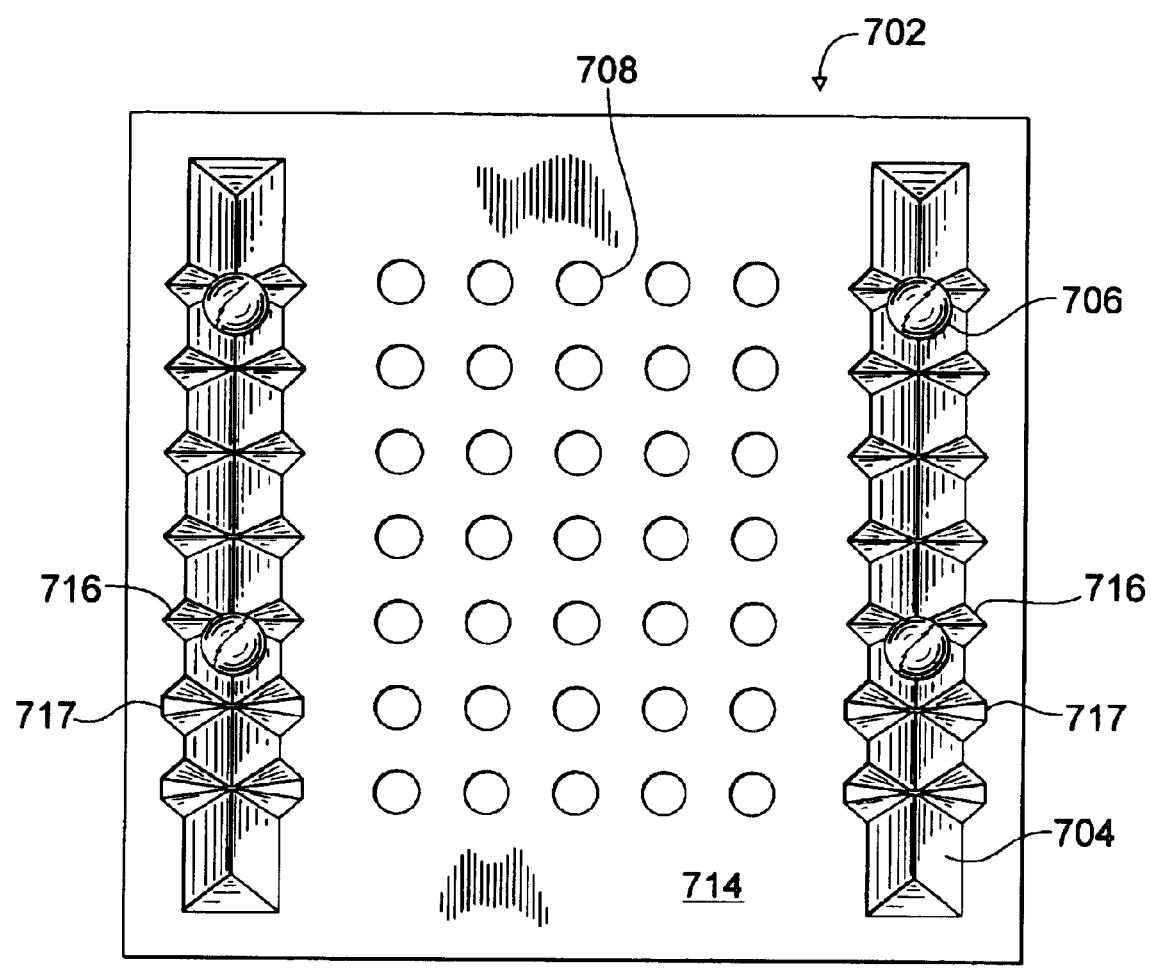
FIG. 7 schematically illustrates a front elevational view of an array having detents within the grooves.

Referring now to FIG. 7, detents 716 may also be disposed according to alternative configurations for purposes of enabling registration between fibers of two opposing arrays. The array 702 includes two parallel grooves 704 formed in a front face 714 of the array 702. The grooves 704 are located along opposite edges of the front face 714 of the array 702. A plurality of fiber-retaining channels 708 are disposed in an array between the grooves 704. The channels 708 extend perpendicularly from the front face 714 through the body of the array 702. The channels 708 are disposed in a preselected number of rows, with each row running perpendicularly to the grooves 704 and in a preselected number of columns running parallel to the grooves 704. The number of detents 716 should correspond either directly or indirectly to the preselected number of rows of channels 704. As shown in FIG. 7, the detents 716 are located in registry with each row of channels 708. The number of detents may indirectly correspond to the number of rows by employing detents at every other row position in one groove and at every other intermediate row in the other groove. The detents 716 may have a shape similar to the detents 616 of the array 602 of FIG. 6.

Figure 8:
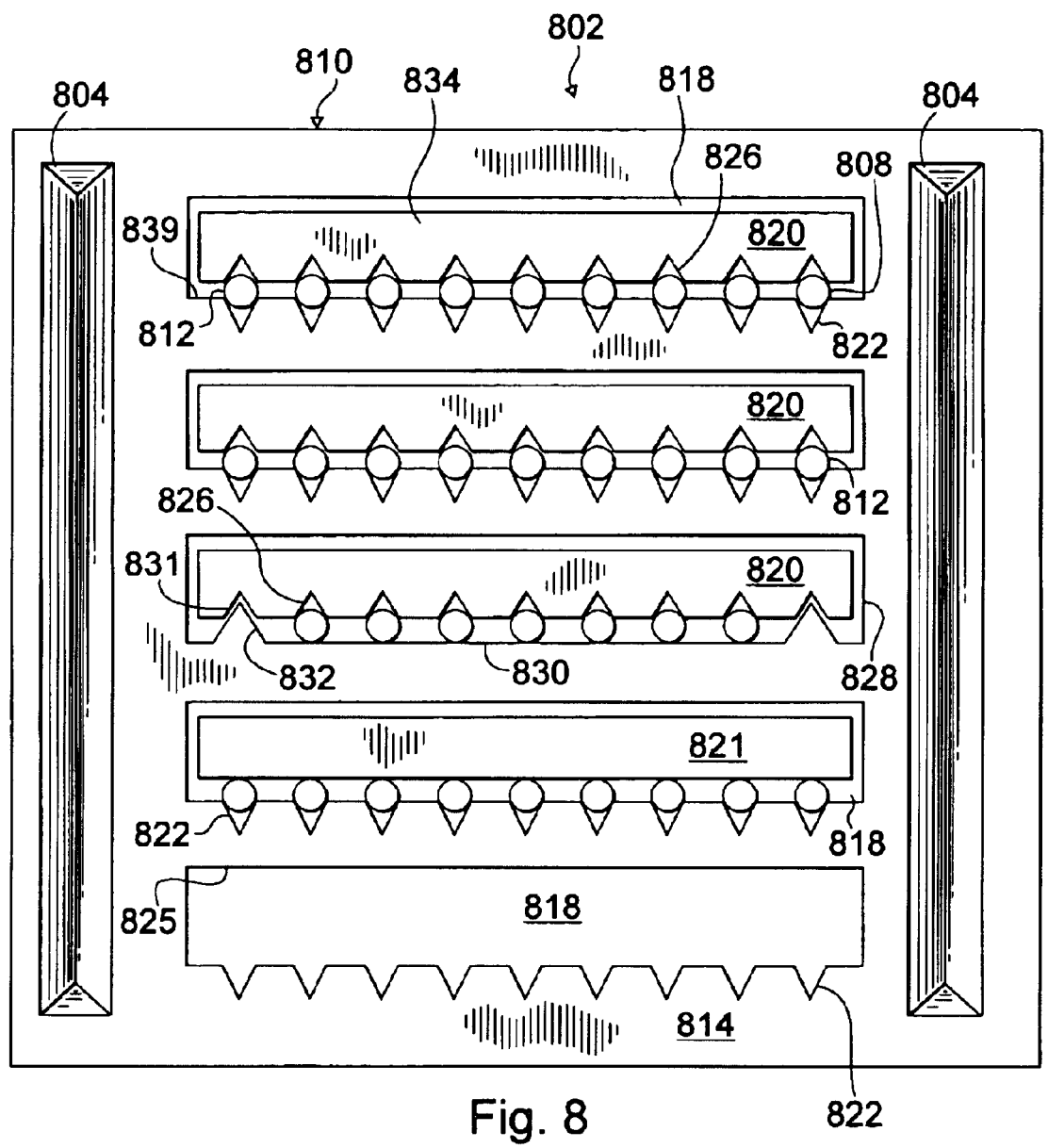
FIG. 8 schematically illustrates an array having an array frame with passageways having different configurations and corresponding insert members having different configurations for insertion into the passageways of array frame for retaining fibers within the array.

The fiber-retaining channels of any array may be created using differing structures. In a first channel structure, as depicted in FIGS. 1 and 2, the channels 108 comprise a cylindrical bore that extends through the body of the array 102 along a longitudinal axis that is perpendicular to the front face 114 of the array 102. Alternatively, as shown in FIG. 8, for example, fiber-retaining channels 808 may be provided by a series of fiber retaining grooves 822 formed along the base surface 839 of one or more passageways 818 passing through a frame 810 of the array 802. The passageways 818 extend from the front face 814 of the array 802 through the body of the array 802 and terminate at an opposing rear face of the array 802. The passageways 818 may extend a distance of about 200 to 1500 microns into the array 802, for example. The passageways 818 may have a generally rectangular cross-section taken in a plane parallel to the front face 814 of the array 802. Alternatively, the passageways 818 may have different cross-sectional shapes suited to the retention of the fibers 812 in the array 802. An opposing fiber chip 820 is dimensioned for insertion into a cavity 818 in position to enclose the fiber retaining grooves 822 to create fiber channels 808, as shown in FIG. 8. Chip grooves 826 may be provided in the chip 820 so as to oppose and run coextensively, at least in part, with the retaining grooves 822 to form the fiber channels 808 therebetween.

More specifically, the chip 820 may include a series of grooves 826 disposed to form an edge having a generally crenelated cross-sectional shape. The grooves 826 extend from a front face 834 of the chip 820 through the body of the chip 820 and terminate at an opposing rear face of the chip 820. Each groove 826 has a cross-sectional shape, such as a V-shaped cross-section, appropriate for retaining an optical fiber 812 in the fiber-retaining grooves 822 as depicted in FIG. 8. Other suitable shapes such as a rectangular, square, or circular shape, for example, may also be employed. The grooved chip 820 may be used as a lidchip to engage the fibers 812 against the base surface 839 of a grooved passageway 818. The grooves 822 on the base surface 839 may be provided as a separate basechip or may, as shown in FIG. 8, be provided directly on the base surface 839, which thereby functions as an integral basechip. Alternatively, a lidchip need not be used. Instead, the fibers 812 may be held in place within the retaining grooves 822 using a suitable adhesive.

The front face 834 of the lidchip 820 may be disposed in a plane parallel to the plane of the front face 814 of the array 820. The front face 834 may also be disposed within the plane of the front face 814 of the array 820. Alternatively, the front face 834 of the lidchip 820 may be recessed into the interior of the array 820. The front face 834 of the lidchip 820 may also be disposed away from the fiber endface which lies proximate the plane of the front face 814 of the array 802.

The fiber-retaining grooves 822 may be disposed along one or more surfaces of the passageway 818 to form a passageway surface having a generally crenelated cross-sectional shape. The fiber-retaining grooves 822 extend from the front face 814 of the array 802 through the body of the array 802 and terminate at the rear face of the array 802. Each fiber-retaining groove 822 has a cross-sectional shape appropriate for retaining an optical fiber 812, such as a V-shaped cross-section, as depicted in FIG. 8. Other shapes such as rectangular, square, or circular shapes, for example, may also be used. For example, the shape of the fiber-retaining groove 822 may be selected to retain a polarization maintaining fiber, such as a polarization maintaining fiber having a triangular or D-shaped cross-section. The groove 822 may also optionally include a wick stop trench disposed within the base of the passageway internally of the array 802 to prevent the flow of an adhesive from the rear of the groove 822 to the front of the groove 822 located at the front face 814 of the array 802.

The passageways of any array may be identical to one another or may have differing shapes as depicted in FIG. 8. As an alternative to the fiber-retaining grooves 822, a different-shaped passageway 828 may include a generally flat bottom surface 830 against which the optical fibers 812 rest. Such a configuration may be particularly useful for retaining a fiber ribbon in place. Alternatively, a grooved lidchip 820 may be used to confine the fibers of the array within the grooves 826 of the lidchip 820 and against the flat bottom surface 830. In addition, to aid in the registration of the grooves, the passageway 828 may include at least one positioning probe 832 disposed on the base surface of the passageway for engagement with complementary sockets 831 of the lidchip 820. In particular, the probe 832 may be dimensioned to engage corresponding grooves 826 of the lidchip 820, which serves as the sockets.

As an alternative, a lidchip 821 without grooves may be employed to enclose the optical fibers 812 within the fiber-retaining grooves 822 on the base surface 839 of a passageway 818 to retain the optical fibers 812 in fixed position with respect to the array 802. The lidchip 821 may be held in fixed relation with respect to the fibers 812 and the array 802 using a suitable adhesive. The lidchip 821 is dimensioned to fit within the clearance of the passageway 818 and extends a sufficient length into the passageway to retain the fibers 812 within the fiber-retaining grooves 822. The lidchip 821 may have a generally rectangular solid shape with a generally flat fiber-engaging surface which abuts against the optical fibers 812.

In order to effect switching, the fiber array 802 comprises two longitudinally extending grooves 804 that are formed in the front face 814 of the fiber array 802. The grooves 804 are similar to the groove 104 described above with respect to array 102 of FIG. 2. The grooves 804 function to permit translational movement of the array 802 relative to an opposing array to effect switching.

Figure 10:
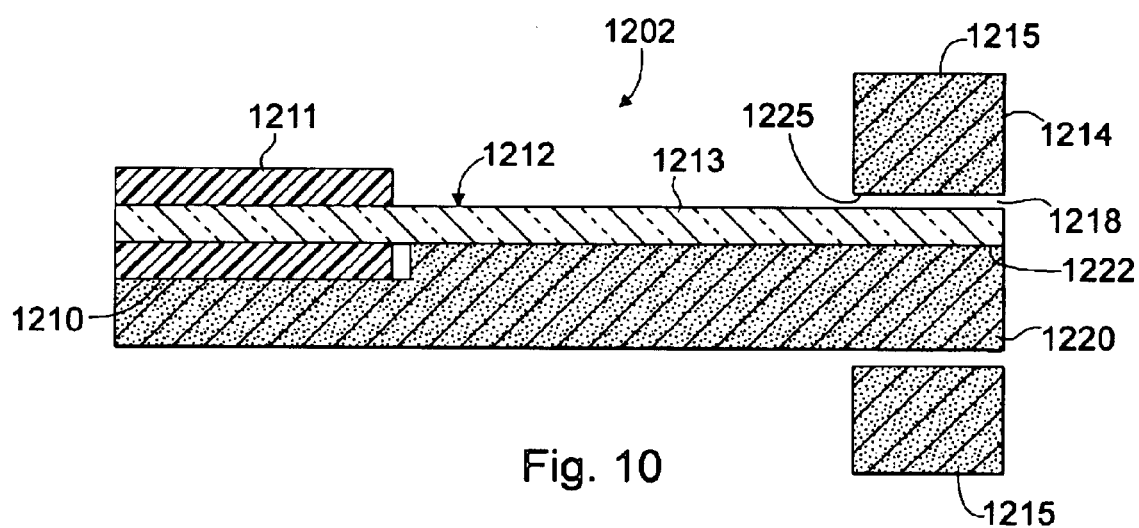
FIG. 10 schematically illustrates a cross-sectional view of an array for retaining a partially un-jacketed fiber.

Referring to FIG. 10, individual fibers 1212 may be held in position within an array by the use of grooved basechips 1220 that are insertable into passageways 1218 through the frame 1215 of the array. In certain applications, as shown in FIG. 10, the basechip 1220 may be configured to retain fibers 1212 wherein each fiber 1212 has a narrow fiber segment 1213 and an adjoining wide fiber segment 1211. The narrow fiber segment 1213 may comprise a clad core of an optical fiber and the wide fiber segment 1211 may comprise a jacketed fiber. Grooves 1222 in the basechip 1220 may be dimensioned to retain the narrow fiber segment 1213 proximate the front face 1214 of the array 1202. The basechip 1220 may include a recessed area 1210 dimensioned to accept and hold the wide fiber segment 1211. The recessed area 1210 is provided at the end of the grooves 1222 disposed distal to the front face 1214 of the array 1202. As shown in FIG. 10, the recessed area 1210 extends deeper into the basechip 1220 than the grooves 1222 to accommodate the increased width of the wide fiber segment 1211. Grooves can optionally be provided in the top wall 1225 of the passageway 1218 to receive the fibers held by the basechip. Alternatively, the basechip 1220 can be inverted to serve as a lidchip for insertion into a passageway 818 of the array 802 of FIG. 8. Further, basechip and lidchip pairs can be utilized for insertion into a passageway 1218. In such an arrangement, fibers can be held between basechip and an enclosing lidchip within the passageway 1218.

Figure 9A:
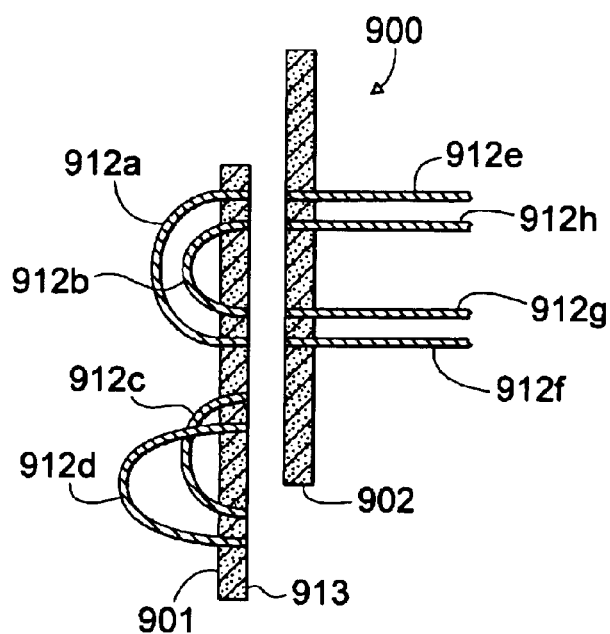
FIGS. 9a and 9b schematically illustrate cross-sectional side elevational views of a M×N switch configuration of the present invention.
Figure 9B:
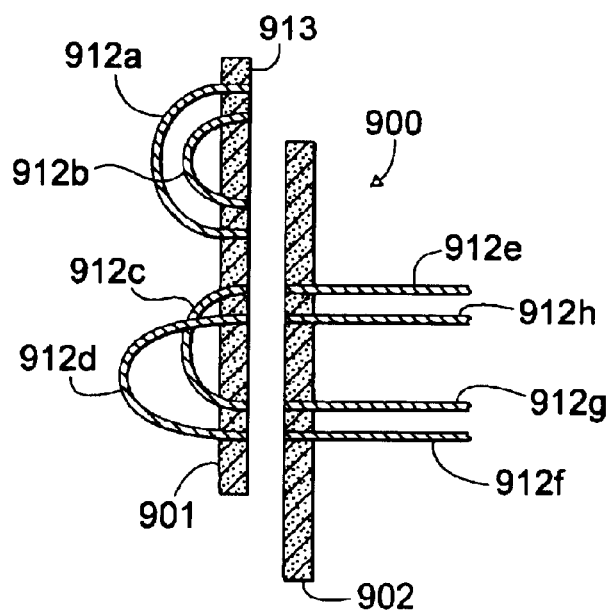

The switch configurations described above may also be used to provide an M×N switch. In particular, FIGS. 9a and 9b illustrate a 2×2 switch 900 of the present invention. The fibers 912a, 912b, 912c and 912d of the first array 901 are arranged so that the input and the output end of each fiber are disposed at the front face 914 of the array 901. Both ends of each fiber 912a, 912b, 912c and 912d are disposed within channels of the first array 901 so that the endfaces of the fibers are disposed proximate the front face 914 of the first array 901 to provide a loop back light path for each fiber. Thus, both ends of a selected fiber 912a of the first array 901 may communicate with respective fibers 112e and 912f of the second array 902. This arrangement effects communication between fiber 912e of the second array 902 and fiber 912f of the second array 902. Likewise, loop back fiber 912b of array 901 functions to connect fibers 912h and 912g of array 902.

As shown in FIG. 9b, as the first array 901 is translated with respect to the second array 902 into another switch position, the fiber 912e of the second array 902 is brought into registry with the fiber 912c of the first array 901. Fiber 912c of the first array 901 has both of its ends disposed within the first array 901 in a loop back fashion similar to that of fiber 912a. However, by locating the two ends of loop back fiber 912c at a spacing that is different than the spacing between the ends of loop back fiber 912a, loop back fiber 912c functions to bring fiber 912e of the second array into communication with a different fiber 912g of the second array 902 than fiber 912f. Likewise, loop back fiber 912d of array 901 functions to connect fiber 912h with fiber 912f of array 902.

The arrays described above may be fabricated of suitable materials in which the grooves, channels, passageways, and detents are formed. For example, one particularly suited material is single crystal Silicond which may be etched by isotropic or anisotropic processes to form the grooves. In particular, grooves such as V-shaped grooves 104 or truncated V-shaped grooves 204 may be formed by anisotropic etching of Silicond. The channels and the passageways may be formed using reactive ion etching (RIE). In addition to RIE processes, other dry or wet physical/chemical etching processes, especially directional etching processes can be used to form the features of the array. In addition, the grooves that retain roller elements may have a nitride coating to provide wear resistance and passivation.

It will be recognized by those skilled in the art that changes or modifications may be made to the above-described embodiments without departing from the broad inventive concepts of the invention. For example, the switch can also comprise one or more waveguide chips instead of a fiber array. In such a case the switching is effected between waveguides in the waveguide chips. It should therefore be understood that this invention is not limited to the particular embodiments described herein, but is intended to include all changes and modifications that are within the scope and spirit of the invention as set forth in the claims.

What is claimed is:

1. A fiber optic array switch comprising:
    first and second substrates, each substrate comprising:
        a front and an opposing rear face, the front faces of each substrate disposed in facing relation to one another;
        at least one fiber-retaining channel disposed in each substrate extending from the front face to the rear face; and
        at least a first groove disposed along a longitudinal axis within the front face; and
    at least one friction reducing element disposed within the first grooves of the first and second substrates, so that the first substrate may translate with respect to the second substrate along the direction of the longitudinal axis of the groove of the first substrate.

2. The switch according to claim 1 wherein the grooves are in registration.

3. The switch according to claim 1 wherein the grooves have the same length.

4. The switch according to claim 1 wherein at least one groove of the first substrate is dimensioned to match a selected dimension of the friction reducing element so that the friction reducing element is confined within the groove of the first substrate.

5. The switch according to claim 1 wherein at least one of the grooves comprises at least one detent dimensioned to at least temporarily retain the friction reducing element at a selected position.

6. The switch according to claim 5 wherein the at least one fiber-retaining channel of the first substrate comprises a plurality of channels arranged in a preselected number of rows and wherein the number of detents in the groove of the first substrate is correlated to the preselected number of rows.

7. The switch according to claim 6 wherein the detents are spaced relative to the spacing among the rows of channels.

8. The switch according to claim 7 wherein the at least one fiber-retaining channel of the second substrate comprises a plurality of channels arranged in a preselected number of rows and wherein the number of detents in the groove of the second substrate is correlated to the preselected number of rows of channels of the second substrate.

9. The switch according to claim 8 wherein the detents in the groove of the second substrate are spaced relative to the spacing among the rows of channels of the second substrate, so that locating the friction reducing element in respective detents of the first and second substrates provides registration between respective channels of the first and second substrates.

10. The switch according to claim 1 wherein the first substrate comprises a second groove disposed within the front face of the first substrate.

11. The switch according to claim 10 comprising a second friction reducing element disposed within the second groove.

12. The switch according to claim 11 wherein the second groove is dimensioned to match a selected dimension of the second friction reducing element so that the second friction reducing element is confined within the second groove.

13. The switch according to claim 10 wherein the second groove is parallel to the first groove of the first substrate.

14. The switch according to claim 10 wherein the second groove is orthogonal to the first groove of the first substrate.

15. The switch according to claim 14 wherein the second groove communicates with the first groove of the first substrate.

16. The switch according to claim 10 wherein the second substrate comprises a second groove disposed within the front face of the second substrate.

17. The switch according to claim 16 wherein the second grooves of the first and second substrate are in registration and wherein the switch comprises a second friction reducing element disposed in the second grooves.

18. The switch according to claim 17 wherein the first and second substrates each comprise a third groove having first and second ends, the first end in communication with the respective first groove and the second end in communication with the respective second groove.

19. The switch according to claim 18 wherein the third grooves are perpendicular to the respective first grooves.

20. The switch according to claim 17 wherein the first grooves are in at least partial registration, and wherein the first groove of the first substrate is dimensioned to a selected dimension of the first friction reducing element so that the first friction reducing element does not translate within first groove of the first substrate, and wherein the second grooves are at least in partial registration and the second groove of the second substrate is dimensioned to a selected dimension of the second friction reducing element so that the second friction reducing element does not translate within the second groove of the second substrate.

21. The switch according to claim 10 wherein the at least one channel is disposed between the first and second grooves of the first substrate.

22. The switch according to claim 1 wherein the at least one channel of the first substrate comprises a linear array of channels.

23. The switch according to claim 22 wherein the linear array comprises a basechip having base grooves formed therein to provide the channels.

24. The switch according to claim 23 wherein the basechip is integrally formed with the first substrate.

25. The switch according to claim 23 wherein the linear array comprises a lidchip having fiber retaining grooves formed therein, and wherein the lidchip is positioned opposite to the basechip so that the grooves of said basechip and the grooves of said lidchip are aligned relative to one another to provide the channels.

26. The switch according to claim 25 wherein the basechip includes a probe and the lidchip includes a complementary socket for registering the basechip to the lidchip.

27. The switch according to claim 1 wherein the at least one channel of the first and second substrates comprise channels disposed in a two-dimensional array of channels.

28. The switch according to claim 1 wherein the at least one channel of the first substrate comprises channels disposed in a two-dimensional array of channels.

29. The switch according to claim 28 wherein the two-dimensional array of channels comprises linear arrays of channels arranged to provide the two-dimensional array.

30. The switch according to claim 29 wherein at least one of the plurality of linear arrays comprises a basechip having fiber retaining grooves formed therein to provide the channels.

31. The switch according to claim 30 wherein the basechip is integrally formed with the first substrate.

32. The switch according to claim 31 wherein the linear array comprises a lidchip having fiber retaining grooves formed therein, and wherein the lidchip is positioned relative to the basechip so that the fiber retaining grooves of said basechip and fiber retaining grooves of said lidchip are aligned to one another to provide the channels.

33. The switch according to claim 32 wherein at least one of the basechip and the lidchip includes a probe and at least one of the other basechip and lidchip includes a complementary socket for aligning the basechip to the lidchip.

34. The switch according to claim 1 wherein the friction reducing element is substantially spherical.

35. The switch according to claim 1 wherein the friction reducing element is cylindrical.

36. The switch according to claim 1 wherein the friction reducing element has a circular cross-section.

37. A fiber optic array switch comprising:
   a first and a second fiber array, each array having a front face, the front faces disposed in facing relation to one another;
   a first groove disposed along a first path within the front face of the first array;
   a second groove disposed along the front face of the second array; and
   a friction-reducing element disposed in the first groove and intermediate the front face of the first and second arrays to reduce friction between the first array and the second array as the first array is displaced relative to the second array.
   whereby a fiber of the first array is movable into and out of optical communication with a selected fiber of the second array to effect switching.

38. The switch according to claim 37 wherein the friction-reducing element includes a first roller element disposed within the first groove of the first array and in contact with the front face of the second array, so that the first array may be displaced relative to the second array along the direction of the first path.

39. The switch according to claim 38 wherein the second groove is disposed in opposing relationship with the first groove to provide a single path of relative displacement between the first and second arrays.

40. The switch according to claim 39 wherein the second groove is disposed relative to the first groove to provide more than one path of relative displacement between the first and second arrays.

41. The switch according to claim 40 wherein the first and second grooves are longitudinal grooves and wherein the second path provided by the second groove intersects the first path of the first groove at a selected angle to provide at least two paths of relative displacement.

42. The switch according to claim 41 wherein the longitudinal axis of the first groove is orthogonal to the longitudinal axis of the second groove, whereby the first array may translate with respect to the second array in a direction orthogonal to the first longitudinal axis.

43. The switch according to claim 38 wherein the first and second grooves are disposed to provide two-dimensional relative displacement of the first and second arrays.

44. The switch according to claim 38 wherein the first and second grooves have the same length.

45. The switch according to claim 37 wherein the first groove is dimensioned to match a selected dimension of the roller element so that the roller element is confined within the first groove during relative displacement of the first and second array.

46. The switch according to claim 37 wherein the first groove comprises at least one detent dimensioned to temporarily hold a roller element in a certain position within the first groove to permit the first and second arrays to be aligned relative to each other.

47. The switch according to claim 46 wherein the first array comprises a plurality of fiber channels arranged in a preselected number of rows of fiber channels, and wherein the number of detents in the first groove matches to the preselected number of rows of fiber channels.

48. The switch according to claim 47 wherein the detents are spaced to match the pitch of the rows of fiber channels.

49. The switch according to claim 47 wherein the second array comprises a plurality of fiber channels arranged in a preselected number of rows of fiber channels, and wherein the second groove cooperates with the first groove of the first array and the second groove includes at least one detent, the number of detents in the second groove matches the preselected number of rows of fiber channels in the second array.

50. The switch according to claim 49 wherein the detents in the second groove are spaced to the pitch of the rows of fiber channels of the second array, so that locating the roller element in respective detents of the first and second arrays provides registration between respective fiber channels of the first and second arrays.

51. The switch according to claim 38 comprising a third groove disposed within the front face of the first array.

52. The switch according to claim 51 comprising a second roller element disposed within the third groove.

53. The switch according to claim 52 wherein the third groove is dimensioned to match a selected dimension of the second roller element so that the second roller element is confined within the third groove of the first array.

54. The switch according to claim 51 wherein the third groove is parallel to the first groove.

55. The switch according to claim 51 wherein the third groove communicates with the first groove.

56. The switch according to claim 55 wherein the third groove is orthogonal to the first groove.

57. The switch according to claim 51 comprising a fourth groove disposed within the front face of the second array.

58. The switch according to claim 57 wherein the first groove of the first array and the second groove of the second array are in at least partial registration to confine the first roller element.

59. The switch according to claim 58 wherein the third groove of the first array and the fourth groove of the second array are in at least partial registration and wherein the switch comprises a second roller element disposed within the third and fourth grooves.

60. The switch according to claim 51 wherein the first array includes a fifth groove having first and second ends disposed within the front face of the first array, the first end in communication with the first groove and the second end in communication with the third groove.

61. The switch according to claim 60 wherein the second array includes a sixth groove having first and second ends disposed within the front face of the second array, the first end in communication with the second groove and the second end in communication with the fourth groove.

62. The switch according to claim 38 wherein the first array comprises a plurality of fiber channels.

63. The switch according to claim 62 wherein the fiber channels of the first array comprise a linear array of channels.

64. The switch according to claim 63 wherein the first array comprises a chip having fiber retaining grooves formed therein to provide the channels for holding fibers of a fiber array.

65. The switch according to claim 64 wherein the first array includes a frame and a passageway through the frame and wherein the chip is insertable into the passageway of the first array.

66. The switch according to claim 62 wherein the first array includes a frame and a passageway through the fame and wherein the first array includes grooves in the passageway to provide the fiber channels.

67. The switch according to claim 66 comprising a chip insertable into the passageway to hold the fiber in the fiber channels.

68. The switch according to claim 66 wherein the first array comprises a chip having chip grooves formed therein, the chip being insertable into the passageway so that the chip grooves may register with the grooves of the passageway to provide the fiber channels.

69. The switch according to claim 63 wherein the first array includes a frame and a passageway through the frame and wherein the first array includes a chip insertable into the passageway to hold fibers in the fiber channels and wherein the first array includes a probe on at least one of the passageway and the chip and a complementary socket on at least the other of the passageway and the chip for registering the chip within the passageway.

70. The switch according to claim 63 wherein the fiber channels of the first array comprise a two-dimensional array of channels.

71. The switch according to claim 70 wherein the two-dimensional array of channels comprises a plurality of linear arrays of channels arranged to form the two-dimensional array.

72. The switch according to claim 38 wherein the roller element is substantially spherical.

73. The switch according to claim 38 wherein the roller element is cylindrical.

74. The switch according to claim 38 comprising optical fibers disposed within the first array.

75. The switch according to claim 38 wherein the first array holds at least one optical fiber.

* * * * *